US006763714B2

(12) United States Patent
Molina et al.

(10) Patent No.: US 6,763,714 B2
(45) Date of Patent: Jul. 20, 2004

(54) METHOD AND APPARATUS FOR CONTROLLING THE LEVEL OF LIQUIDS

(75) Inventors: Mario Molina, Novara (IT); Antonio Pasquale, Novara (IT)

(73) Assignee: Gigi Molina Brevetti Plastici, S.p.A., Romentino (IT)

( * ) Notice: Subject to any disclaimer, the term of this patent is extended or adjusted under 35 U.S.C. 154(b) by 0 days.

(21) Appl. No.: 10/296,139

(22) PCT Filed: May 28, 2001

(86) PCT No.: PCT/IT01/00270
§ 371 (c)(1),
(2), (4) Date: Nov. 21, 2002

(87) PCT Pub. No.: WO01/92834
PCT Pub. Date: Dec. 6, 2001

(65) Prior Publication Data
US 2003/0131661 A1 Jul. 17, 2003

(30) Foreign Application Priority Data
May 31, 2000 (IT) .................... MI2000A1215

(51) Int. Cl.[7] .............................................. G01F 23/14
(52) U.S. Cl. ......................................... 73/302; 73/298
(58) Field of Search ................... 73/299, 302, 32 R, 73/438, 298

(56) References Cited
U.S. PATENT DOCUMENTS 3,955,411 A * 5/1976 Lawson, Jr. ............. 73/152.22
4,006,635 A * 2/1977 Khoi ......................... 73/302
4,043,193 A * 8/1977 Bailey ..................... 73/152.22
4,338,809 A * 7/1982 Englund ................... 73/1.73
4,393,705 A * 7/1983 Eidschun .................... 73/439
4,485,675 A * 12/1984 Verret ....................... 73/439
5,245,869 A    9/1993 Clarke
5,953,954 A    9/1999 Drain

FOREIGN PATENT DOCUMENTS

FR        2643454      8/1990
WO      99 27328 A    6/1999

* cited by examiner

Primary Examiner—Hezron Williams
Assistant Examiner—Katina Wilson
(74) Attorney, Agent, or Firm—Dann, Dorfman, Herrell and Skillman; Henry H. Skillman

(57) ABSTRACT

Method for controlling the level of a liquid (2) contained in at least one vessel (3), which comprises the following operative steps: inserting a measure tube (1) in the liquid (2); arranging an auxiliary duct (6; 21) inside or outside the vessel (3); measuring the pressure in said measure tube (1); measuring the pressure in said auxiliary duct (6; 21); determining the difference between the pressures in the measure tube (1) and in the auxiliary duct (6; 21); determining the value of the density or the specific weight of the liquid (2) in the vessel (3); dividing said pressure difference by said value of the density or specific weight of the liquid (2). The present invention also relates to an apparatus for carrying out said method.

29 Claims, 5 Drawing Sheets

METHOD AND APPARATUS FOR CONTROLLING THE LEVEL OF LIQUIDS

The present invention relates to a method for controlling the level of liquids, and in particular to a method that can be employed for controlling the level of liquids contained in vats with free surfaces and/or tanks under pressure, for instance those present in the semiconductor manufacturing systems. The present invention also relates to an apparatus for carrying out said method.

Apparatuses for controlling the level of liquids are known to comprise a control device provided with a pressure sensor connected to a measure tube immersed in the liquid to be controlled. The value measured by the pressure sensor, divided by the value of the density or specific weight of the liquid, determinates its level.

However, these known apparatuses provide approximate results since the values measured by the pressure sensor are influenced by the local pressure, for example by the atmospheric pressure or by the pressure in a tarn under pressure, which can vary during the time.

It is therefore an object of the present invention to provide a method and an apparatus for controlling the liquid level, which are free from this disadvantage. Said object is achieved with a method and an apparatus, the main features of which are specified in claims 1 and 6, respectively, while other features are specified in the remaining claims.

Thanks to the measurement of the pressure in an auxiliary duct and to the calculation of the relevant difference with the pressure in the measure tube, the method and the apparatus according to the present invention allow to obtain measurements of the liquid level more precise than the known methods and apparatuses.

According to an advantageous aspect of the invention, the apparatus can correct the value of the density or specific weight of the liquids according to their temperature, so as to further improve the measurement precision.

According to another advantageous aspect of the invention, the apparatus can be provided with a single pressure sensor and with an electric valve for alternatively measuring the pressure in the measure tube and in the auxiliary duct. With this arrangement, the manufacturing costs are decreased and errors due to measure differences with a further pressure sensor are avoided.

According to a farther advantageous aspect of the invention, the measure tube of the apparatus can be connected to a source of gas under pressure, so as to measure the counter-pressure corresponding to the pressure exerted on the gas by the liquid. With this arrangement, it is avoided that noxious vapors released by the liquid can reach the control device through the measure tube.

According to another advantageous aspect of the invention, the apparatus is provided with electronic memories and calculation means which serve for determining the liquid level and for controlling the calculation parameters, as well as other useful parameters for the correct working of the apparatus. Furthermore, with this arrangement, the apparatus according to the present invention can control not only the level of the liquid contained in a vessel, but also the working of a rinsing vat, with further decrease of the costs when the apparatus is employed in a semiconductor manufacturing system.

For decreasing the manufacturing and maintenance costs of the apparatus, said electronic calculation means can advantageously consist in a programmable logic controller of the known kind, which can also be connected to an external computer for the remote control of the apparatus according to the present invention.

Further advantages and features of the method and the apparatus according to the present invention will be clear to those skilled in the art from the following detailed and non-limiting description of some embodiment thereof with reference to the attached drawings, wherein.

Figure 1:
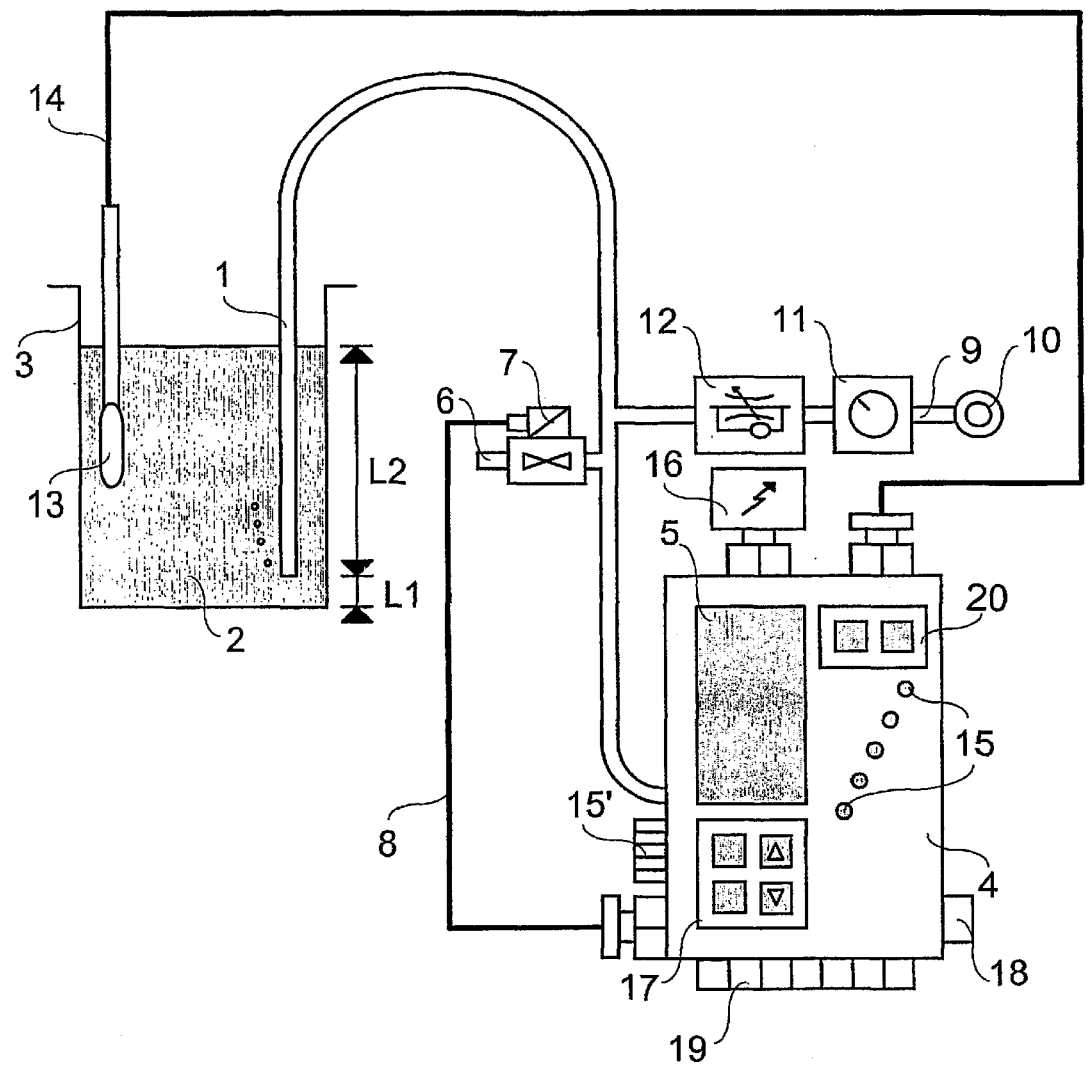
FIG. 1 shows a schematic view of a first embodiment of the apparatus according to the present invention.

Referring to FIG. 1, it is seen that the apparatus according to the first embodiment of the invention comprises in a known way a measure tube 1 immersed in a liquid 2 contained in a vessel 3, for instance a vat for acid liquids of a semiconductor manufacturing system. An end of the measure tube 1 is arranged at a level L1 from the bottom of vessel 3, while the other end is connected to a pressure sensor arranged in a control device 4, which comprises electronic means calculating the difference between the pressure value detected by the pressure sensor and a stored value which corresponds to a local reference pressure, for instance equal to the value of the atmospheric pressure. Said electronic calculation means divide then the value of this pressure difference by a stored value which is proportional to the density or to the specific weight of liquid 2. The value resulting from said division corresponds in a known way to the level L2 of the portion of measure tube 1 immersed into liquid 2 and is shown by a display 5, for example a LCD display. The value of level L2, before it is shown by display 5, can be added to a stored value equal to level L1, for obtaining the real value H=L1+L2 of the level of the free surface of liquid 2 from the bottom of vessel 3.

According to the invention, the measure tube 1 is connected to an auxiliary duct 6 which is provided with an electric valve 7 and has the free end arranged inside or outside vessel 3, in particular communicating with the environment adjacent to vessel 3. The electric valve 7 is connected through a cable 8 with the control device 4, so that the latter can open it cyclically, thereby setting the measure tube 1 in communication with the environment for a determinate time period through the auxiliary duct 6. When the electric valve 7 is open, the pressure sensor of the control device 4 measures a reference pressure, for instance the local or atmospheric pressure, the value of which is stored in the electronic calculation means, thereby substituting the previously stored value of the reference pressure. After a determinate period, the electric valve 7 is closed, so that the control device 4 can detect again the pressure exerted by liquid 2 onto the fluid contained in the measure tube 1, and consequently determinate the level of the liquid itself.

The measure tube 1 can be suitably connected through a duct 9 to a source 10 of compressed gasses, for instance nitrogen or air. Duct 9 is provided with a valve 11 for adjusting the pressure of the introduced gas and with a throttling valve 12 for adjusting its flow rate. By adjusting valves 11 and 12 it is possible to run gas into the measure tube until it slightly gurgles into liquid 2. With this arrangement, the counter-pressure measured in the measure tube 1 exactly corresponds to the pressure exerted onto the gas by liquid 2.

The apparatus according to the present invention preferably comprises a thermal probe 13, for instance of the PT100 type, which is immersed into liquid 2 and is connected with a cable 14 to the control device 4. One or more tables of values proportional to the density or to the specific weight of liquids according to their temperature can be stored in the control device 4. By selecting the table corresponding to the liquid 2 contained in vessel 3, the electronic calculation means can obtain from this table, according to the temperature measured by the thermal probe 13, a determinate value of density or specific weight, which is then used for calculating the level of liquid 2 in the above described way.

One or more threshold values, in particular five values, can further be stored in the control device 4. When these values are greater or less than the value of the level of liquid 2, the control device 4 turns on corresponding pilot lamps 15, for instance of the LED type, so as to give the user an immediate level information. Furthermore, the control device 4 is preferably provided with a plurality of ports 15', in particular five ports, to which external electric or electronic devices (not shown in the figure), for instance alarm devices, can be connected. Through ports 15' the control device 4 transmits electric signals when said threshold values are greater or less than the value of the level of liquid 2, so as to turn on or off said external devices.

The control device 4 is also connected to an electric source 15, for instance a 24V DC power source, and further comprises a keyboard 17 for data entry, an interface 18, for example a serial port RS-232 or RS-485, for the connection to an external computer, as well as a plurality of connectors 19 and a pair of push-buttons 20, the working of which will be explained later.

Figure 2:
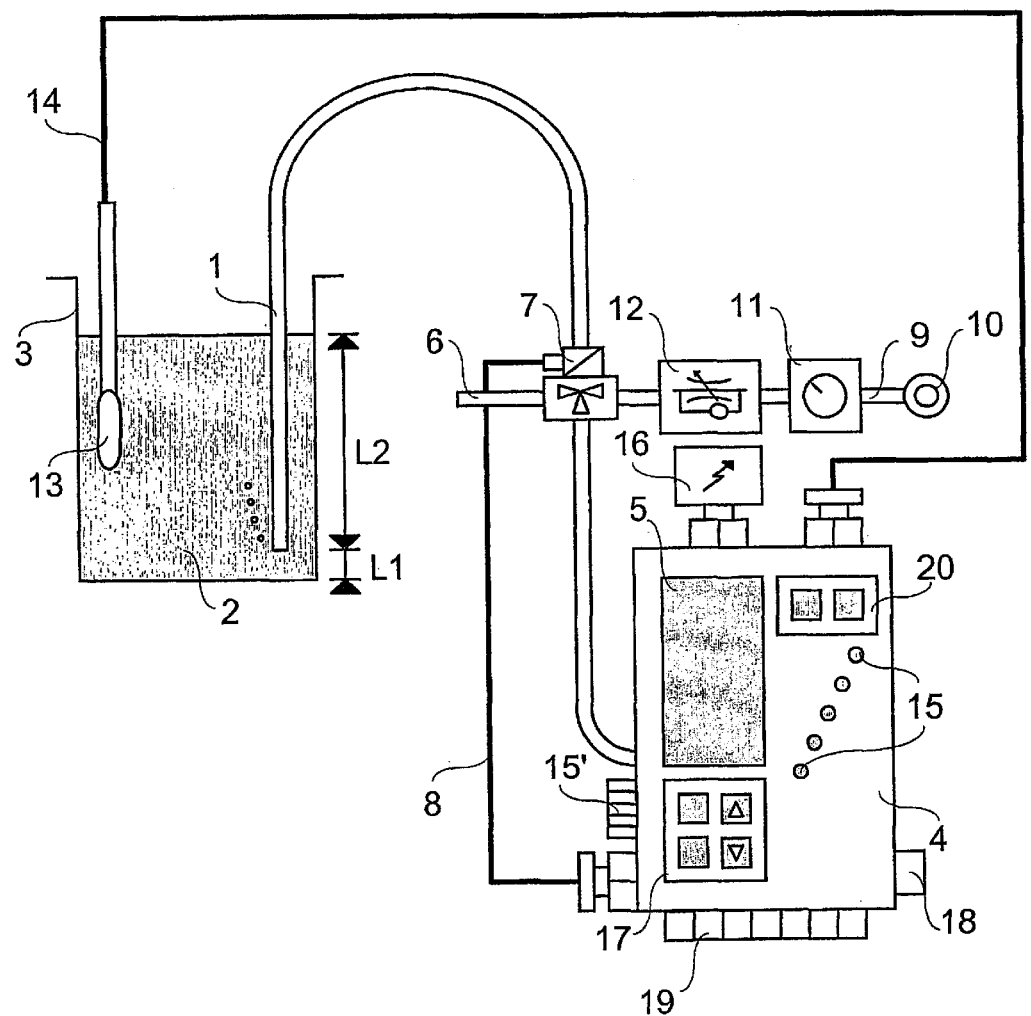
FIG. 2 shows a schematic view of a second embodiment of the apparatus according to the present invention.

With reference to FIG. 2, it is seen that in a second embodiment of the invention the electric valve 7 is an electric three-way valve suitable for alternately connecting the auxiliary duct 6 or duct 9 to the measure tube 1. With this arrangement, it is avoided that the gas coming from duct 9 is introduced into the measure tube 1 when the local pressure is measured through the auxiliary duct 6.

Figure 3:
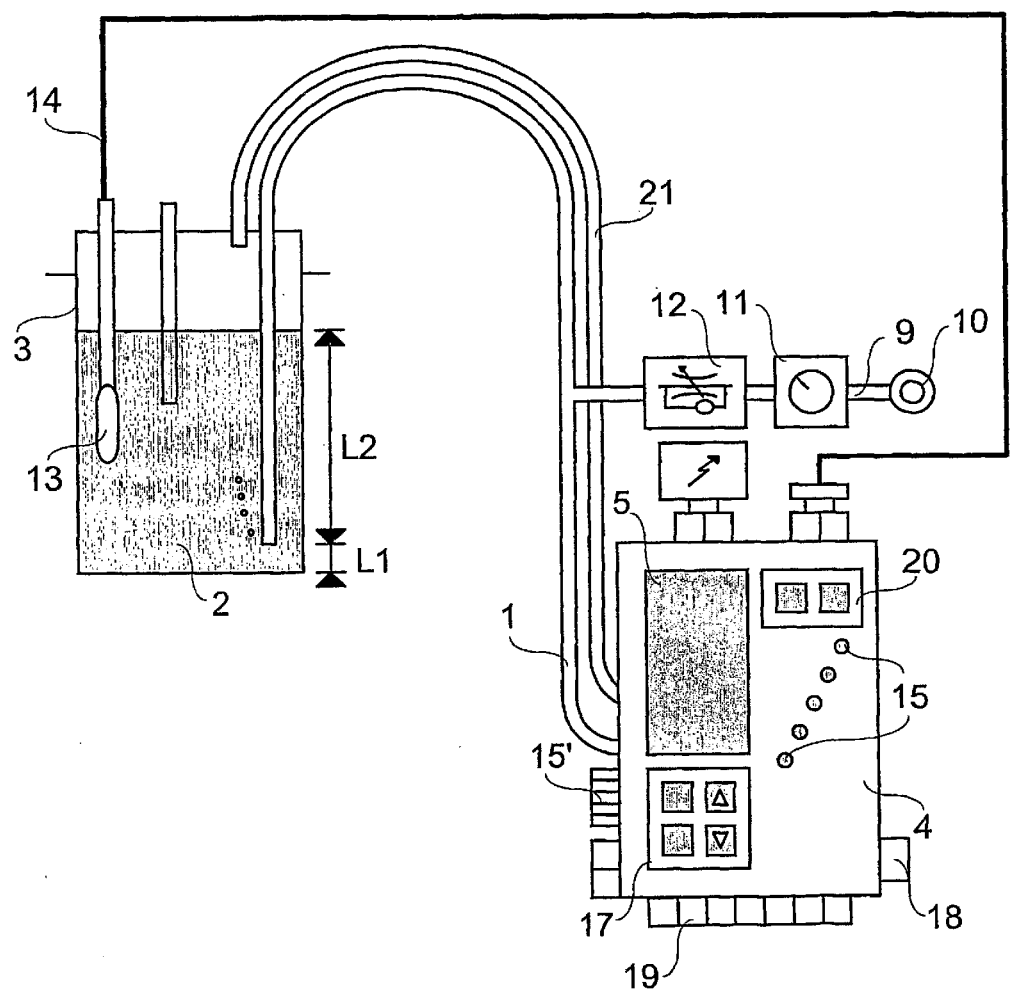
FIG. 3 shows a schematic view of a third embodiment of the apparatus according to the present invention.

Referring now to FIG. 3, it is seen that in a third embodiment of the invention the control device 4 comprises two pressure sensors. The first sensor measures the pressure in the measure tube 1 as in the previous embodiments, while the second sensor measures the pressure in an auxiliary duct 21 having the free end arranged in the environment of vessel 3. In the present embodiment vessel 3 is a closed tank, so that the free end of the auxiliary duct 21 is arranged inside the tank, in the empty portion under its cover. With this arrangement, the reference pressure inside the auxiliary duct 21, for instance the atmospheric or local pressure, and the pressure inside the measure tube 1 can be continuously measured, so that it is not necessary anymore an electric valve for measuring in an alternated way the reference pressure through the same tube.

Figure 4:
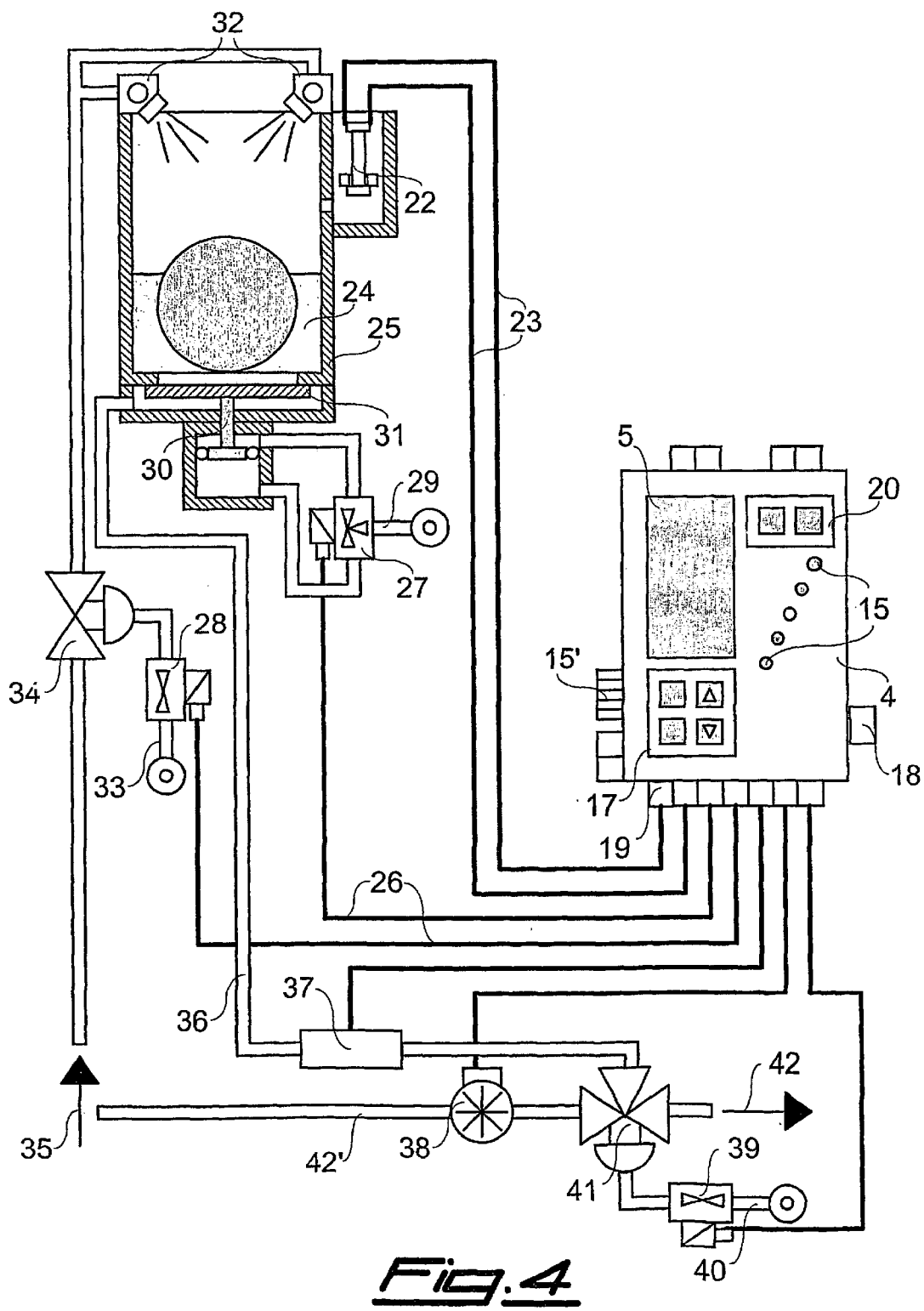
FIG. 4 shows a schematic view of the apparatus of FIG. 1 connected to a rinsing vat.

In FIG. 4 it is seen that a level sensor 22, for instance a sensor with a magnetic float, is connected through one or more cables 23 to connectors 19 of the control device 4. The level sensor 22 sends to the control device 4 an electric signal according to the level of liquid 24 contained into a vat 25, for example the level of very pure water present in a QDR (Quick Dump Rinser) rinsing vat. Vat 25 is distinguished from vessel 3 which can be for instance a vat for acid liquids generally arranged near a rinsing vat in the semiconductor manufacturing systems. According to the signal transmitted by the level sensor 22, the control device 4 sends electric signals through connectors 19 and one or more cables 26 to a pair of electric valves 27, 28.

The first electric valve 27 is a three-way electric valve that controls the inflow of compressed air coming from a source 29 to a pneumatic piston 30 moving the bottom 31 of vat 25 for emptying or filling it with the liquid discharged by one or more sprayers 32.

The second electric valve 28 controls instead the inflow of compressed air coming from a source 33 for opening or closing a pneumatic valve 34 suitable for controlling the inflow to sprayers 32 of the liquid 24 coming from an external source, shown with an arrow 35.

The liquids drained by vat 25 through bottom 31 pass through a draining duct 36 preferably provided with a conductometer 37, for instance a precision conductometer produced by the firm Thornton, which sends electric signals through connectors 19 to the control device 4. Conductometer 37 is preferably provided with a PT100 thermal sensor for correcting the conductivity value of liquid 24 according to its temperature.

Finally, a third electric valve 39 can be connected to connectors 19. The electric valve 39 can control the inflow of compressed air coming from a source 40 for opening or closing a pneumatic three-way valve 41 suitable for deviating liquid 24 coming from the draining duct 36 to a drain shown with arrow 42 or to a delivery duct 42' which delivers liquid 24 again toward sprayers 32. Delivery duct 42' is preferably provided with a flow rate meter, for instance a flow meter Signet 2507 of the firm George Fischer, which sends electric signals to the control device 4 through connectors 19.

Figure 5:
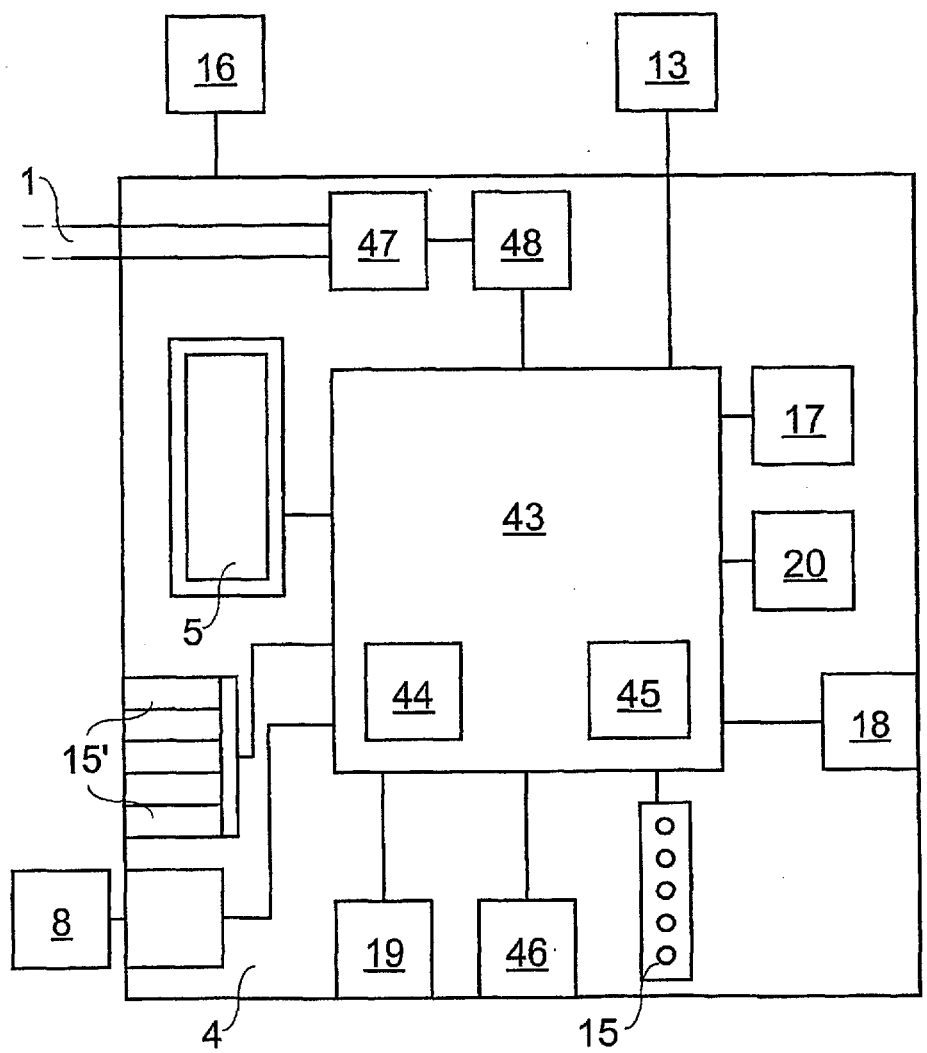
FIG. 5 shows a schematic view of the control device of the apparatus of FIG. 1.

With reference to FIG. 5, it is seen that the control device 4 comprises the above mentioned electronic calculation means 43, which in the present embodiment consist in a programmable logic controller (PLC), for example a PLC model 78F0078 of the firm NEC. PLC 43 is suitably provided with a RAM memory 44 in which temporary parameters, for instance pressure and density measured by the sensors, can be stored for calculating the level of liquid 2. PLC 43 is further suitably provided with a Flash ROM memory 45 in which the software for the working of the control device 4 and the relevant parameters can be stored, for instance:

the tables of the values of density or specific weight according to the temperature, the height of level L1 of the free end of the measure tube 1, the height of the levels corresponding to the threshold values of the pilot lamps 15, the closing and opening time intervals of the electric valves 7, 27, 28 and/or 39, the number of rinsing cycles in vat 25, a correction value of the level hysteresis of liquid 2, a correction value of the environmental or atmospheric pressure, a value corresponding to the area of vessel 3, for calculating the volume of liquid 2 contained therein, conversion constants of the pressure and/or temperature measure units, date and time, as well as further parameters useful for the correct working of the apparatus according to the present invention.

These parameters can be shown through display 5, which is connected to PLC 43. For storing further data, PLC 43 can also be connected to an interface 46 for removable memories, for instance of the Flash kind, or to an external computer through interface 18.

The measure of the pressure in measure tube 1 is carried out by a precision sensor 47, for instance a resistive-type sensor such as sensor CS55224 of the firm Crystal, which is connected to PLC 43 by means of an analog-digital converter 48. PLC 43 is further directly or indirectly connected, for instance through optoisolators, to probe 13, pilot lamps 15, keyboard 17, interface 18, connectors 19 and push-buttons 20.

During the use, the user turns the control device 4 on and enters through keyboard 17 the above listed parameters for the working of the apparatus according to the present invention. Periodically, the control device 4, according to the parameters entered by the user, calculates by means of the above described method the level value of liquid 2 and shows it through display 5 and/or the pilot lamps 15.

In the meanwhile, the user can start the rinses in vat 25 and enters the number of the relevant cycles by means of the push-buttons 20. In this case, the control device 4 opens the electric valve 28 for filling vat 25 with liquid 24. When the level sensor 22 detects the filling of vat 25, the control device 4 closes the electric valve 28 and waits for a determinate period of time, after which it empties vat 25 by opening bottom 31 by means of the electric valve 27. If the liquids drained by vat 25 through draining duct 36 are detected sufficiently pure by conductometer 37, the control device 4 recovers them in the delivery duct 42' by operating valve 41 by means of the electric valve 39. Flow meter 38 measures the quantity of recovered liquids 24. If instead the liquids are not sufficiently pure, the control device 4 drains them by operating in the opposite way valve 41, always by means of the electric valve 39. Once liquid 24 has been drained, the control device 4 closes the bottom 31 of vat 25, waits for a determinate time period and starts again a rinsing cycle in the above described way, until the number of cycles programmed by the user has been reached.

Further modifications and/or additions may be made by those skilled in the art to the embodiments of the invention hereinabove described and illustrated while remaining within the scope of the invention itself.

What is claimed is:

1. Method for controlling the level of a liquid contained in at least one vessel, comprising the following operative steps:
   inserting one end of a measure tube in the liquid;
   arranging an auxiliary duct outside the liquid, said auxiliary duct being inside or outside the vessel;
   measuring the pressure in said measure tube;
   measuring the pressure in said auxiliary duct;
   determining the difference between the pressures in the measure tube and in the auxiliary duct;
   determining the value of the density or the specific weight of the liquid in the vessel;
   dividing said pressure difference by said value of the density or specific weight of the liquid,
   characterized in that the method comprises the step of storing the values of the density or the specific weight of the liquid into one or more electronic memories.

2. Method according to claim 1, including the step of measuring the temperature of the liquid, characterized in that the density or the specific weight of the liquid in the vessel are determined according to the temperature of the liquid itself.

3. Method according to claim 1, characterized in that the pressures in the measure tube and in the auxiliary duct are alternately measured by a same pressure sensor.

4. Method according to claim 1, characterized in that a gas under pressure is introduced into the measure tube and comes out from its end immersed in the liquid.

5. Method according to claim 1, wherein the measure tube is inserted to position its inserted end at a selected height from the bottom of the vessel,
   characterized in that the result of said division is added to a value of said selected height.

6. Method according to claim 1, including the step of exposing the liquid to atmospheric pressure, and positioning the auxiliary duct to be subject to non-pressurized atmospheric pressure.

7. Apparatus for controlling the level of a liquid contained in at least one vessel, which comprises a measure tube having one end immersed into this liquid and a control device provided with at least one pressure sensor connected to said measure tube,
   wherein said control device is also provided with an auxiliary duct arranged outside of the liquid, said auxiliary duct being inside or outside the vessel, a sensor for measuring the pressure in said auxiliary duct, electronic calculation means for calculating the difference between the pressures in the measure tube and in the auxiliary duct, as well as for dividing said pressure difference with one or more values of the density or the specific weight of the liquid, and one or more electronic memories which can be read by said calculation means,
   characterized in that said values are stored into said one or more electronic memories.

8. Apparatus according to claim 7, characterized in that the control device is provided with one pressure sensor only for alternatively measuring the pressures in the measure tube immersed into the liquid and in the auxiliary duct.

9. Apparatus according to claim 7, characterized in that the control device comprises a first sensor that measures the pressure in the measure tube and a second sensor that measures the pressure in the auxiliary duct arranged inside or outside the vessel.

10. Apparatus according to claim 7, wherein a thermal probe is immersed into the liquid for detecting its temperature,
    characterized in that the control device is connected to the thermal probe to be and that the electronic calculation means select from one or more tables stored into the one or more electronic memories at least one value proportional to the density or to the specific weight of the liquid according to the temperature of the liquid detected by said thermal probe.

11. Apparatus according to claim 7, characterized in that the control device is provided with at least one display for showing the level of the liquid calculated by the electronic calculation means.

12. Apparatus according to claim 7, characterized in that the control device is provided with one or more external electric or electronic devices and pilot lamps and said one or more electronic memories are operable for storing one or more threshold values, and that said electronic calculation means turn on or off the one or more external electric or electronic devices or the one or more pilot lamps according to said threshold values and to the level of the liquid.

13. Apparatus according to claim 7, characterized in that the control device is provided with at least one interface for the connection to an external computer.

14. Apparatus according to claim 7, characterized in that the control device is provided with a keyboard for data entry.

15. Apparatus according to claim 7, wherein said at least one vessel comprises a vat having a level sensor for detecting the level of the liquid contained in the vat,
    characterized in that the control device is connected to the level sensor and to one or more electric valves controlled by the control device according to the level detected by said level sensor.

16. Apparatus according to claim 15, wherein a pneumatic valve is provided for controlling the inflow of the liquid to said vat,
   characterized in that one another of said electric valves controls the inflow of compressed air for opening or closing the pneumatic valve.

17. Apparatus according to claim 15, wherein a drain is connected to the bottom of the vat and a delivery duct is connected to the bottom of the vat for recovering the liquid in the vat, and a three-way pneumatic valve is provided for directing the liquid coming from the bottom of said vat to the drain or to the delivery duct,
   characterized in that one another of said electric valves controls the inflow of compressed air for opening or closing the three-way pneumatic valve.

18. Apparatus according to claim 17, characterized in that said drain connected to the bottom of said vat is provided with a conductometer connected to the control device.

19. Apparatus according to claim 17, characterized in that said delivery duct is provided with a flow rate meter connected to the control device.

20. Apparatus according to claim 17, characterized in that the electronic calculation means comprise a programmable logic controller provided with one or more memories in which temporary parameters for the calculation of the level of the liquid, software for the working of the control device and the relevant working parameters can be stored.

21. Apparatus according to claim 20 wherein said at least one vessel comprises a vat having a plurality of valves, and electronic calculation means to turn on or oil one or more external electric or electronic devices and/or one or more pilot lamps according to said threshold values and to the level of the liquid, characterized in that said working parameters comprise one or more of the following values:
   the tables of the values of density or specific weight of the liquid according to the temperature,
   the height of the level of the free end of the measure tube,
   the height of the levels corresponding to the threshold values of the pilot lamps,
   the closing and opening time intervals of the electric valves,
   the number of rinsing cycles in the vat,
   a correction value of the level hysteresis of the liquid,
   a correction value of the environmental or atmospheric pressure,
   a value corresponding to the area of the vessel, for calculating the volume of the liquid contained therein,
   conversion constants of the pressure and/or temperature measure units, and date and time.

22. Apparatus according to claim 20, characterized in that the pressure sensor is a resistive-type sensor which is connected to the programmable logic controller by means of an analog-digital converter.

23. Apparatus according to claim 21, characterized in that said working parameters can be shown by the programmable logic controller on the display.

24. Apparatus according to claim 7, wherein said liquid is exposed to atmospheric pressure, and the pressure in said auxiliary duct is non-pressurized atmospheric pressure.

25. Apparatus for controlling the level of a liquid contained in at least one vessel, which comprises a measure tube having one end immersed into this liquid and a control device provided with a single pressure sensor connected to said measure tube,
   wherein said control device is also provided with an auxiliary duct arranged outside of the liquid, said auxiliary duct being inside or outside vessel, said single sensor operable for measuring the pressure alternatively in measure tube and in said auxiliary duct, electronic calculation means for calculating the difference between the pressures in the measure tube and in the auxiliary duct, as well as for dividing said pressure difference with one or more values of the density or the specific weight of the liquid, and one or more electronic memories which can be read by said calculation means,
   characterized in that said values are stored into said one or more electronic memories, said apparatus including an electric valve connected to the control device by means of one or more cables is arranged between the measure tube and the auxiliary duct, so that when said electric valve is open or closed said pressure sensor measures the pressures in the auxiliary duct or in the measure tube, respectively.

26. Apparatus according to claim 25, characterized in that the measure tube is connected to a source of gas under pressure through a duct provided with an electric valve for adjusting the pressure of the introduced gas and with a throttling valve for adjusting its flow rate.

27. Apparatus according to claim 26, characterized in that said electric valve is a three-way electric valve alternately connecting the measure tube with the duct of the gas under pressure or the auxiliary duct.

28. Apparatus for controlling the level of a liquid contained in at least one vessel, which comprises a measure tube having one end immersed into this liquid and a control device provided with at least one pressure sensor connected to said measure tube),
   wherein said control device is also provided with an auxiliary duct arranged outside of the liquid, said auxiliary duct being inside or outside the vessel, a sensor for measuring the pressure in said auxiliary duct, electronic calculation means for calculating the difference between the pressures in the measure tube and in the auxiliary duct, as well as for dividing said pressure difference with one or more values of the density or the specific weight of the liquid, and one or more electronic memories which can be read by said calculation means,
   characterized in that said values are stored into said one or more electronic memories, and the measure tube is connected to a source of gas under pressure through a duct provided with a valve for adjusting the pressure of the introduced gas and with a throttling valve for adjusting its flow rate.

29. Apparatus for controlling the level of a liquid contained in at least one vessel comprising a vat having a level sensor for detecting the level of the liquid contained in the vat, a pneumatic piston for opening or closing the bottom of said vat, and a measure tube having one end immersed into the liquid and a control device provided with at least one pressure sensor connected to said measure tub;
   wherein said control device is also provided with an auxiliary duct arranged outside of the liquid, said auxiliary duct being inside or outside the vessel a sensor for measuring the pressure in said auxiliary duct, electronic calculation means for calculating the difference between the pressures in the measure tube and in the auxiliary duct, as well as for dividing said pressure difference with one or more values of the density or the specific weight of the liquid, and one or more electronic memories which can be read by said calculation means, characterized in that said values are stored into said one or more electronic memories, said control device being connected to said level sensor and having one or more electric valves controlled by the control device according to the level detected by said level sensor, characterized in that one of said electric valves is a three-way electric valve which controls the inflow of compressed air to the pneumatic piston.

* * * * *

UNITED STATES PATENT AND TRADEMARK OFFICE
CERTIFICATE OF CORRECTION

PATENT NO. : 6,763,714 B2
DATED : July 20, 2004
INVENTOR(S) : Molina et al.

It is certified that error appears in the above-identified patent and that said Letters Patent is hereby corrected as shown below:

Column 1,
Line 19, "tarn" should be -- tank --;

Column 4,
Line 25, "George Fischer" should be -- Georg Fischer --;

Column 5,
Line 1, "Crystal" should be -- Cristal --;

Column 7,
Lines 6 and 15, after "in that", delete "one";
Line 32, "oil" should be -- off --;

Column 8,
Line 15, after "cables", delete "is";
Line 34, "tube)," should be -- tube, --;
Line 57, "tub" should be -- tube --.

Signed and Sealed this

Seventh Day of September, 2004

JON W. DUDAS
*Director of the United States Patent and Trademark Office*